(12) United States Patent
Newell (10) Patent No.: US 10,404,761 B2
(45) Date of Patent: Sep. 3, 2019

(54) SEGREGATING VPN TRAFFIC BASED ON THE ORIGINATING APPLICATION

(71) Applicant: AirWatch LLC, Atlanta, GA (US)

(72) Inventor: Craig Farley Newell, Atlanta, GA (US)

(73) Assignee: Airwatch, LLC, Atlanta, GA (US)

(*) Notice: Subject to any disclaimer, the term of this patent is extended or adjusted under 35 U.S.C. 154(b) by 454 days.

(21) Appl. No.: 15/015,697

(22) Filed: Feb. 4, 2016

(65) Prior Publication Data
US 2017/0230281 A1   Aug. 10, 2017

(51) Int. Cl.
| | |
|---|---|
| *H04L 12/725* | (2013.01) |
| *H04L 29/06* | (2006.01) |
| *H04L 12/46* | (2006.01) |
| *H04L 12/701* | (2013.01) |
| *H04L 12/26* | (2006.01) |
| *H04L 12/931* | (2013.01) |
| *H04L 12/801* | (2013.01) |
| *H04L 12/851* | (2013.01) |
| *H04L 12/911* | (2013.01) |

(52) U.S. Cl.
CPC ...... *H04L 65/1033* (2013.01); *H04L 12/4633* (2013.01); *H04L 12/4641* (2013.01); *H04L 43/062* (2013.01); *H04L 45/00* (2013.01); *H04L 47/10* (2013.01); *H04L 47/15* (2013.01); *H04L 47/2441* (2013.01); *H04L 47/70* (2013.01); *H04L 47/824* (2013.01); *H04L 49/354* (2013.01); *H04L 63/1408* (2013.01)

(58) Field of Classification Search
CPC ..... H04L 47/2441; H04L 47/25; H04L 49/25; H04L 45/00; H04L 63/08; H04L 63/10; H04L 63/0272; H04L 63/164; H04L 65/1033; H04L 45/306; H04L 12/4641; H04L 12/4633; H04L 47/10; H04L 47/15; H04L 47/70; H04L 47/824; H04L 63/1408; H04L 49/354; H04L 43/062
USPC ....... 709/233, 224; 370/401, 395.52, 395.53, 370/235; 726/1
See application file for complete search history.

(56) References Cited

U.S. PATENT DOCUMENTS

2014/0317276 A1* 10/2014 Tie ................. H04L 45/306
709/224
2014/0366081 A1* 12/2014 Wood ................. H04L 63/10
726/1

\* cited by examiner

*Primary Examiner* — Jungwon Chang
(74) *Attorney, Agent, or Firm* — Thomas | Horstmeyer, LLP (57) ABSTRACT

Disclosed are various examples for segregating virtual private network (VPN) traffic based on the originating client application. A tunnel endpoint receives, through a network tunnel, network traffic sent by a client application executed by a client device. The tunnel endpoint identifies characteristics of the client application or the client device. The tunnel endpoint then selects a particular virtual local area network (VLAN) from multiple VLANs based at least in part on the characteristics. The tunnel endpoint then forwards the network traffic to an internal network gateway of an organization using the particular VLAN.

20 Claims, 6 Drawing Sheets

| Service Network | VLAN # | Description |
|---|---|---|
| Compromised | 1 | Captive portal for out-of-policy devices (*e.g.*, jailbroken) |
| Internet Only | 2 | No intranet access, only filtered Internet access |
| Intranet Only | 3 | No Internet access, only internal sites |
| Finance | 4 | Application access to ORACLE IEXPENSE, *etc.* |
| R&D | 5 | Application access to JIRA ticket tracking, source code |
| Sales & Support | 6 | Application access to internal documentation & knowledge base |

SEGREGATING VPN TRAFFIC BASED ON THE ORIGINATING APPLICATION

BACKGROUND

Network security architectures began with a simple model of segregating internal network traffic of an organization from external network traffic. In such a model, internal network traffic is trusted, and external network traffic is untrusted. As a consequence, a device that has access to the internal network of the organization ultimately has access to communicate with any other device on the internal network. This arrangement poses many security issues, however. An attacker who gains access to one device is able to communicate with, and potentially exploit, all other devices on the network. Similarly, an employee who legitimately needs access to one resource on the internal network can inappropriately access other resources on the internal network.

In response to these problems, some organizations started segregating network traffic on a department level or a sub-department level. Devices in different departments can be connected to the internal network using physically separate cabling. For example, accounting department ports can be wired using blue cabling, and customer service department ports can be wired using yellow cabling. The blue cabling can be connected to one physical switch, while the yellow cabling can be connected to another physical switch, thus providing a physical separation between two internal network segments of the organization. Therefore, a device on the accounting department segment cannot communicate with a device on the customer service department segment.

Understandably, physically separate systems can be difficult to implement and maintain. If devices are moved from one port to another, the cabling has to be reconfigured. One solution is to use a virtual local area network (VLAN) architecture. With a VLAN architecture, each port on a router is assigned to a respective virtual network segment. The routers of the organization are configured to route network traffic separately for each virtual network segment. For example, ports corresponding to the devices in the accounting department can be assigned to virtual network segment 0, while the ports corresponding to the devices in the customer service department can be assigned to virtual network segment 1. Although this approach can allow for reconfiguration without having to change physical cabling, it can also be error prone. Moreover, this approach does not account for mobile devices that are not wired into a port or are connected by way of the Internet.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to segregating virtual private network (VPN) traffic based on the originating application and potentially other attributes. Suppose that an enterprise has three databases: financial records, customer communications, and supplier communications. Most users in the organization have specific limited roles and will not need to access all three databases. Users in an accounting department access the financial records database, but not the customer or supplier communications databases. Customer service representatives access the customer communications database, but not the supplier communications or the financial records databases. Conversely, purchasing agents access the supplier communications database but not the customer communications or financial records database. Executive-level employees can have a legitimate need to access any of the databases.

For security reasons, it would be best to limit authorization to the various databases to users who have a legitimate need to access the data to fulfill their organizational role. Thus, if a customer service representative maliciously attempts to access the financial records database, the access will be denied. This provides security not only in the case of a disgruntled employee but also in situations where the device of the employee has been compromised and is under control of another user.

Current approaches to segregating network traffic (e.g., virtual local area networks (VLANs) and physically separate cabling) are insufficient for the mobile device context. Mobile devices are not typically connected through a single switch or router port on the wired network of an organization. For example, a smartphone or tablet can be connected at times through an internal wireless network of the organization or at other times through a VPN connection over the Internet. One approach can be to set up different VPN endpoints on different network segments. For example, contractors of an organization can be given credentials to authenticate with a VPN gateway having one level of access, while employees of the organization can be given credentials to authenticate with a VPN gateway having another level of access. This approach is very coarse grained and can become unmanageable with respect to fine-grained levels of access to network resources.

Additional access controls can be implemented on a per-application basis for a network, thereby potentially reducing the need for separated network segments that operate solely on the device level. Traditionally, different applications have used different transport-layer ports, and network appliances could monitor and route traffic based upon the well-known transmission control protocol (TCP) or user datagram protocol (UDP) source or destination ports. For example, hypertext transfer protocol (HTTP) uses TCP port 80, HTTP secure (HTTPS) uses port 443, and file transfer protocol (FTP) uses TCP port 21. However, due to common firewalling restrictions, most applications now use ports 80 and 443 exclusively, so a mere port-based network restriction is no longer viable. In addition, merely inspecting the network traffic to determine characteristics is often not an option, as applications increasingly default to using encryption for all communication.

Various examples of the present disclosure apply the concept of micro-segmentation to the mobile edge of an organization's network. In micro-segmentation, a virtual network segment can be created for every group of users, or perhaps even a single user, in an organization. Even further, different virtual network segments can be created for different applications on a user's device. These microsegments can employ software-defined networking in order to route traffic based upon characteristics of the traffic that go beyond mere network addresses or port numbers in a packet header. In this regard, the present disclosure introduces approaches for interfacing applications on managed mobile devices with specific virtual network segments using software-defined networking in an organization's network. As will be discussed, VLANs and other approaches can be employed to interface the endpoint of a VPN tunnel with a software-defined networking gateway.

Figure 1:
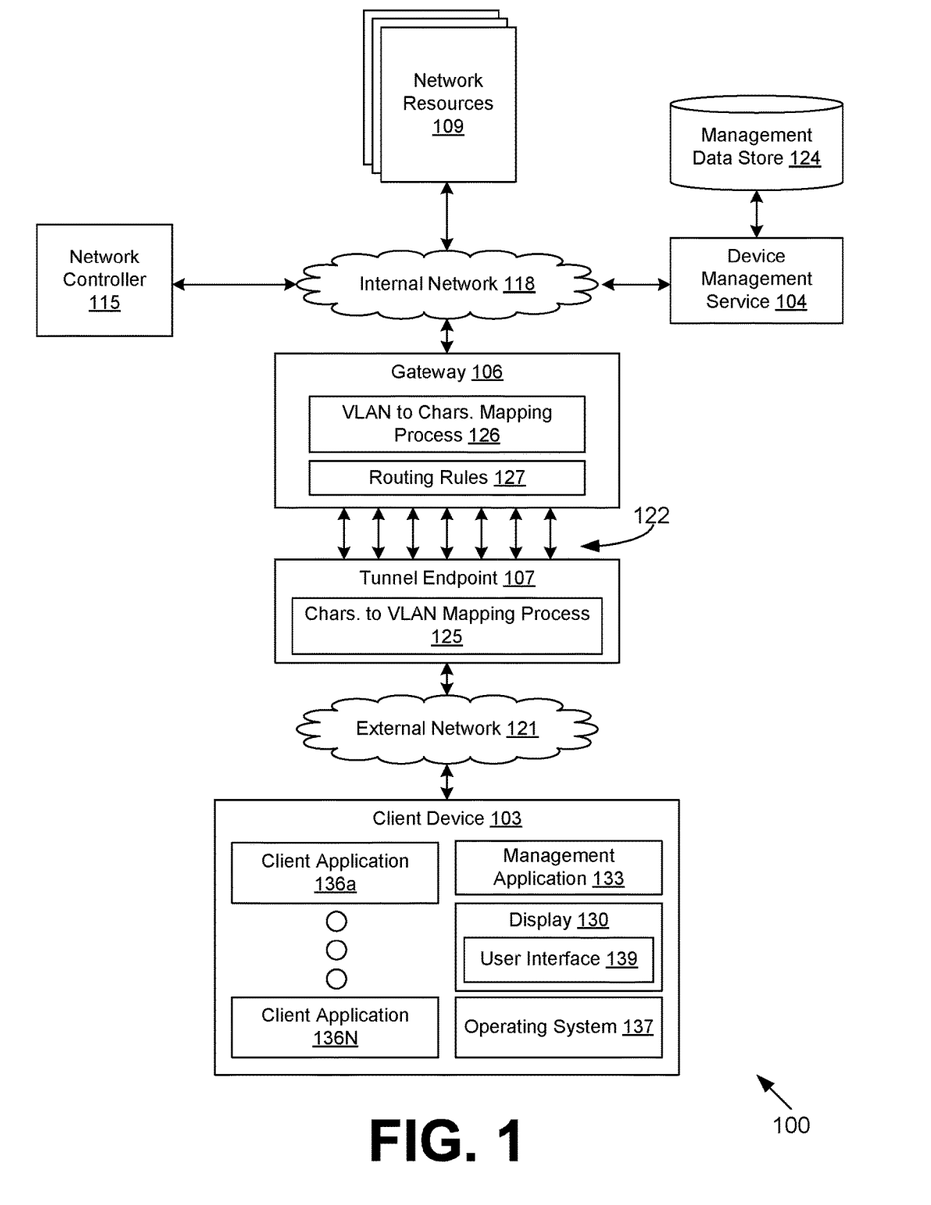
FIG. 1 is a drawing of a networked environment according to various examples of the disclosure.

With reference to FIG. 1, shown is a networked environment 100 according to various examples. The networked environment 100 includes a client device 103, a device management service 104, a gateway 106, a tunnel endpoint 107, a plurality of network resources 109, a network controller 115, an internal network 118, and an external network 121. Communications between the gateway 106 and the tunnel endpoint 107 are routed through a plurality of VLANs 122. The gateway 106, the device management service 104, the network resources 109, and the network controller 115 can be coupled to the internal network 118, while the tunnel endpoint 107 and the client device 103 can be coupled to the external network 121. Each of the internal network 118 and the external network 121 can include, for example, wide area networks (WANs), local area networks (LANs), wired networks, wireless networks, other suitable networks, or any combination of two or more networks. For example, the networks can include satellite networks, cable networks, Ethernet networks, and other types of networks.

The device management service 104, the gateway 106, the tunnel endpoint 107, the network resources 109, and the network controller 115, can include, for example, a server computer, a network device, or any other system providing computing capabilities. Alternatively, the device management service 104, the gateway 106, the tunnel endpoint 107, the network resources 109, and the network controller 115 can employ multiple computing devices that can be arranged, for example, in one or more server banks, computer banks, or other arrangements. The computing devices can be located in a single installation or can be distributed among many different geographical locations. For example, the device management service 104, the gateway 106, the tunnel endpoint 107, the network resources 109, and the network controller 115 can include multiple computing devices that together form a hosted computing resource, a grid computing resource, or any other distributed computing arrangement.

In some cases, the device management service 104, the gateway 106, the tunnel endpoint 107, the network resources 109, and the network controller 115 can operate as at least a portion of an elastic computing resource where the allotted capacity of processing, network, storage, or other computing-related resources can vary over time. The device management service 104, the gateway 106, the tunnel endpoint 107, the network resources 109, and the network controller 115 can also include or be operated as one or more virtualized computer instances. Generally, the device management service 104, the gateway 106, the tunnel endpoint 107, the network resources 109, and the network controller 115 can be operated in accordance with particular security protocols such that they are considered trusted computing environments. The device management service 104, the gateway 106, the tunnel endpoint 107, the network resources 109, and the network controller 115 can be located remotely with respect to the client device 103.

The device management service 104 can manage or oversee the operation of multiple client devices 103. In some examples, an enterprise, such as one or more companies or other organizations, can operate the device management service 104 to oversee or manage the operation of the client devices 103 of employees, contractors, or other users within an enterprise environment. In this sense, the client devices 103 can include managed devices that are managed by the device management service 104.

The client device 103 can be enrolled as a managed device with the device management service 104 through APIs provided by the operating system. The enrollment process can include authentication of a user's credentials. Upon authentication of a user's credentials by the device management service 104, the client device 103, using device management APIs of the operating system, can enroll the client device 103 as a managed device so that various management functions can be performed by the device management service 104.

Examples of management functions can include commands to erase certain data from the client device 103, commands to install certain applications or application updates, commands to lock a client device 103 or activate a display lock feature, a command to remotely perform a factory reset of the client device 103, or other management functions. Additionally, data can be securely transmitted through the secure communications channel to the client device 103 or applications executed by the client device 103.

Additionally, the operating system of the client device 103 can also provide the ability to create access-restricted storage that is associated with particular applications installed on the client device 103. Access-restricted storage can be associated with multiple applications that are installed on the client device 103 through the secure communications channel. In some scenarios, applications that are signed by a common certificate can be provided access to the access-restricted storage of each other, whereas applications that are not signed by the certificate do not have access to the access-restricted storage of other applications. Additionally, the device management service 104 can transmit data to the client device 103 over the secure communications channel that can be stored in the access-restricted storage such that it is accessible by certain applications and inaccessible to other applications that are installed on the client device 103.

The device management service 104 can also facilitate ensuring that client devices 103 that are administered by the device management service 104 are operating in compliance with various compliance rules. In one scenario, the device management service 104 can issue management commands that instruct a client device 103 to take a particular action with respect to a compliance rule. For example, if a client device 103 is designated as lost or stolen, the device management service 104 can issue a command instructing the client device 103 to erase data and applications that were previously sent to the client device 103 through the secure communications channel or other communication links and otherwise stored on the client device 103. The device management service 104 can also obtain data from a third party computing environment, such as an application, a security code, authentication token, or other data. As another example, if the device management service 104 determines that a client device 103 has violated a compliance rule with respect to having unauthorized modifications or unauthorized applications installed on the client device 103, the device management service 104 can issue a command instructing the client device 103 to erase data and applications stored on the client device 103. As a further example, the device management service 104 can also issue a command instructing the client device 103 to activate a display lock of the client device 103 that requires a user to enter a personal identification number (PIN) in order to use the client device 103.

The data stored in the management data store 124 and available to the device management service 104 includes, for example, authentication data, compliance rules, device data, and potentially other data. The authentication data can include data used to verify one or more security credentials presented by a user for authentication. To this end, secure certificates can be stored and then be made available to the client device 103 that has been authenticated in order to encrypt the secure communications channel and/or for other functions.

Within the context of an enterprise, compliance rules include one or more rules that, when violated, can cause the device management service 104 to issue a management command. Compliance rules can include a list of unauthorized hardware functions, software functions, or applications that potentially pose a threat to enterprise data or to the use of enterprise applications. As noted above, if client device 103 falls out of compliance with one or more compliance rules, a management command can be transmitted to the client device 103 instructing the client device 103 to perform one or more actions specified by the compliance rule. Alternatively, a compliance rule can also reside on the client device 103, which can self-enforce compliance rules. The management data store 124 can also include user account data. User account data can include information with which a user account can be authenticated, such as user credentials. User account data can also include data such as email, contact, calendar data, documents, files or other data that is associated with a user account.

Device data can represent data stored in the management data store 124 that is associated with client devices 103 that are enrolled with the device management service 104 as managed devices. Device data can include a unique device identifier associated with the client device 103, device policies that are associated with a particular client device 103, status information associated with a particular client device 103, and other data that facilitates management of the client device 103 by the device management service 104. Device data can also include user data that is synchronized with a particular client device 103. A user account can be associated with multiple client devices 103. Different client devices 103 associated with a user account can have different user account data stored thereon. For example, a user's smartphone can have a certain number of documents or email messages stored on the device, whereas the user's laptop or tablet can have varying amounts of types of user account data stored on the device.

The tunnel endpoint 107 establishes virtual private network (VPN) tunnels with client devices 103 or specific applications executing in client devices 103 through the external network 121 in order to provide the client devices 103 with a secure connection over the external network 121. A tunnel uses a tunnel header to encapsulate the packets from one type of protocol in the datagram of a different protocol. Tunnels in some examples use point-to-point tunneling protocol (PPTP) to encapsulate internet protocol (IP) packets over a public network, such as the Internet. A tunnel encrypts the payload of its packets with one or more keys or secure certificates. This allows packets to be exchanged between the client device 103 and the tunnel endpoint 107 securely. In some examples, the tunnel endpoint 107 (1) encapsulates and encrypts packets sent from the gateway 106 to the client device 103 with a tunnel packet header, and (2) decapsulates tunnel headers from the packets that it receives from the client device 103, and decrypts these packets, before forwarding the packets to the gateway 106.

When a client device 103 tries to establish a tunnel connection with the tunnel endpoint 107, the tunnel endpoint 107 in some examples passes the credential set that it gets from the client device 103 to the device management service 104 in order to authenticate the request. In authenticating the credential set, the device management service 104 in some examples provides one or more mobile device management (MDM) attributes for the client device 103, the user (of the client device 103), and/or the application (executing on the client device 103) requesting the connection.

The tunnel endpoint 107 associates the provided MDM attribute(s) with the data messages that it subsequently received from the client device 103 through the established connection. Also, once the connection is established, the client device 103 embeds one or more MDM attributes for the data messages that it sends in the tunnel header in some embodiments. In some examples, the tunnel endpoint 107 aggregates the MDM attributes that it receives from the device management service 104 and the client device 103 into one set of MDM attributes that it associates with the data messages transmitted by the client device 103 through its connection.

Based on the associated MDM attribute set, for example, defining characteristics of the client device 103 or client applications executed thereon, the tunnel endpoint 107 forwards the network traffic received from the client device 103 to the gateway 106. In doing so, the tunnel endpoint 107 can employ a characteristics to VLAN mapping process 125 that maps these characteristics to specific VLANs of a plurality of VLANs. The tunnel endpoint 107 uses the identified VLAN to send the network traffic to the gateway 106. In one example, an identifier of the VLAN can be specified as a unique identifier or tag in headers of a stream of Ethernet frames sent to the gateway 106. This approach can employ Institute of Electrical and Electronics Engineers (IEEE) 802.1Q, VLAN Trunking Protocol (VTP), Multiple VLAN Trunking Protocol, or other standards. In such approaches, the number of unique VLANs can be limited to 4096 or fewer (e.g., based on a 12-bit header field). As an alternative example, Generic Routing Encapsulation (GRE) tagging can be employed, which allows for a 32-bit tag in the header, or over four billion unique identifiers corresponding to VLANs.

The gateway 106 is configured to provide access to network resources 109 of the internal network 118 for client devices 103 through the tunnel endpoint 107. The gateway 106 can be configured to make routing decisions based on the MDM attribute set, including characteristics of the client device 103 or client applications executed thereon. In various examples of the present disclosure, the gateway 106 receives network traffic from the tunnel endpoint 107 through any of a number of different VLANs 122. The gateway 106 can be configured to use a VLAN to characteristics mapping process 126 to convert a specific VLAN identifier to a set of characteristics associated with the MDM attribute set. Then, based on the characteristics, the gateway 106 can apply routing rules 127 in determining whether to forward the network traffic onto the internal network 118.

In various examples, the internal network 118 employs software-defined networking, where network resources 109 are grouped into microsegments of the internal network 118. Routing decisions by network hardware of the internal network 118 can be based on the characteristics of the network traffic, including the location of the client device 103, the version of the client application, the user's role in the organization, or the time (e.g., time in the day, day of the week, season).

The network resources 109 provide corresponding services for client applications. The services can include, for example, social networking services, email services, voice communication services, enterprise information management services, productivity services, game services, databases, and other services. The network resources 109 can communicate with the client device 103 over the external network 121 and the internal network 118 by way of hypertext transfer protocol (HTTP), simple object access protocol (SOAP), representational state transfer (REST), and/or other protocols.

The network controller 115 is executed to control the gateway 106 and elements within the internal network 118 (e.g., firewalls, routers, bridges, intrusion detection systems, network address translation systems, port address translation systems) in order to implement virtual network segments within the internal network 118 for applications of the client device 103 to access a particular set of network resources 109. A virtual network segment, or microsegment, can be established for each set of network resources 109 such that network traffic from a client application is routable in the internal network 118 only to an approved set of network resources 109 and not to other network resources 109. A given network resource 109 can be accessible through a plurality of different virtual network segments.

Figure 2A:
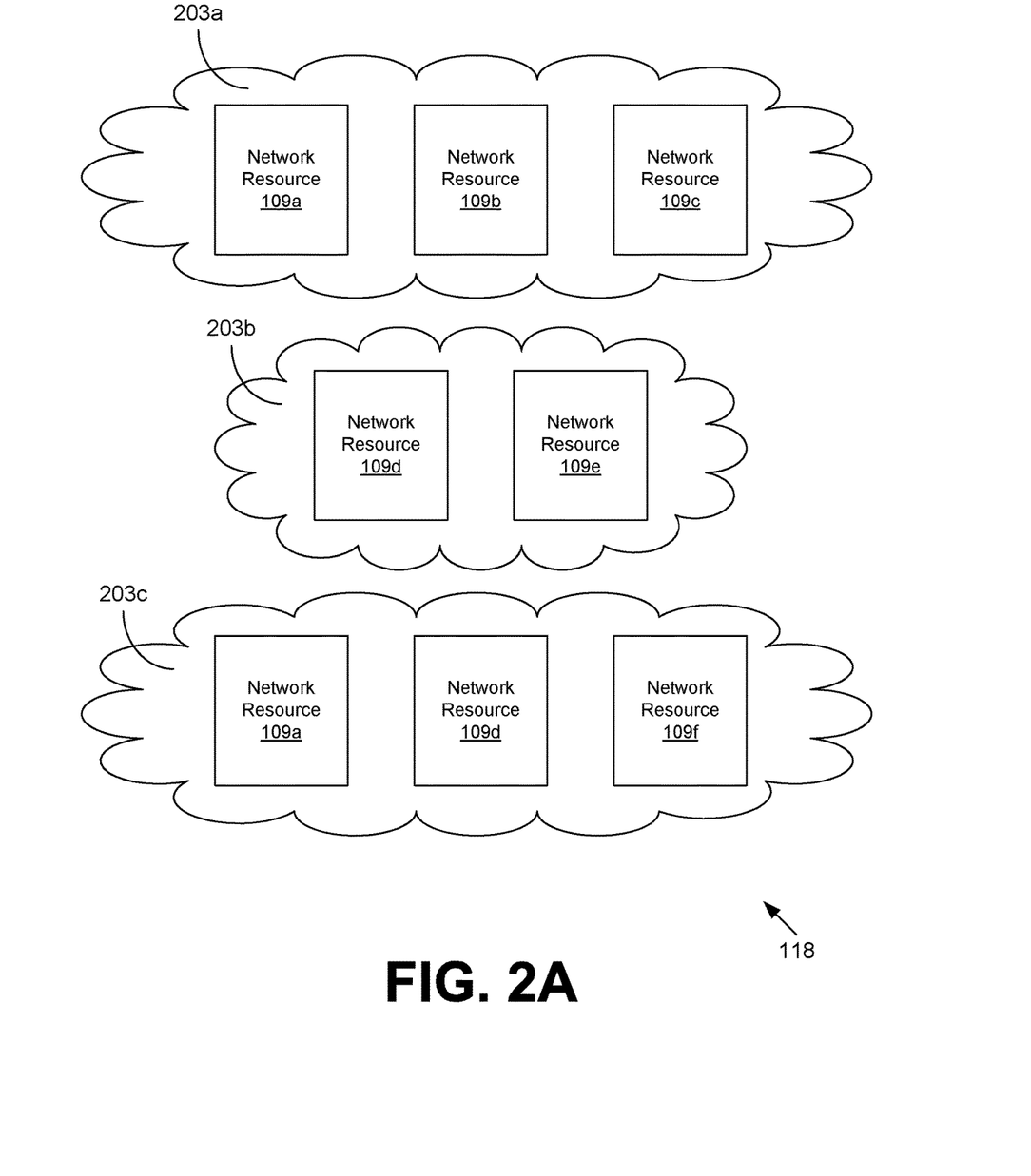
FIG. 2A is a drawing of an example of an internal network with multiple virtual network segments, which can each be associated with different security groups.

Referring now to FIG. 2A, shown is one example of an internal network 118 with multiple virtual network segments 203a, 203b, 203c, which can each be associated with different security groups. In this example, the virtual network segment 203a includes network resource 109a, network resource 109b, and network resource 109c. Virtual network segment 203b includes network resources 109d and 109e. Virtual network segment 203c includes network resources 109a, 109d, and 109f. It is noted that the network resource 109a is accessible through multiple virtual network segments 203a and 203c. Similarly, the network resource 109d is accessible through virtual network segments 203b and 203c. This illustrates that a different combination of resources can be made available through individual virtual network segments 203.

Figure 2B:
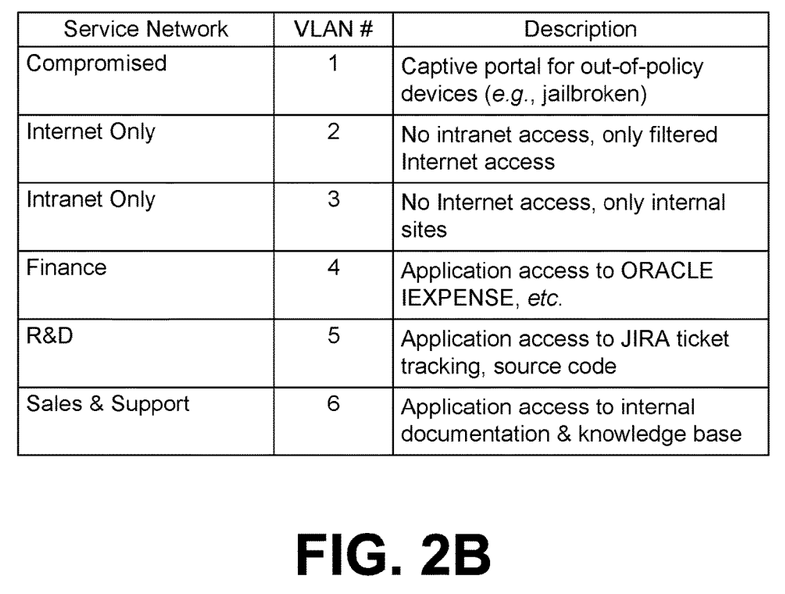
FIG. 2B is a table describing an example segmentation of an internal network into virtual network segments.

Turning now to FIG. 2B, shown is a table describing an example segmentation of the internal network 118 into multiple virtual network segments 203. In this example, six virtual network segments 203 are described, which are labeled "Compromised," "Internet Only," "Intranet Only," "Finance," "R&D," and "Sales & Support." Each virtual network segment 203 is associated with a corresponding virtual local area network (VLAN) number from 1 to 6, and a corresponding description for each virtual network segment 203 is also provided.

Referring back to FIG. 1, the client device 103 can represent a processor-based system, such as a computer system, that can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 103 can include a display 130 that includes, for example, one or more devices such as liquid crystal display (LCD) displays or other types of display devices. The client device 103 can also be equipped with networking capability or networking interfaces, including a localized networking or communication capability such as a near-field communication (NFC) capability, radio-frequency identifier (RFID) read and/or write capability, a microphone and/or speaker, or other localized communication capability.

The client device 103 can execute various applications, such as a management application 133, a plurality of client applications 136a . . . 136N, an operating system 137, and other applications, services, or processes. The management application 133 can receive security credentials from a user and to authenticate with the device management service 104. Although described as an application, it is understood that the management application 133 can be an integral component of the operating system 137 of the client device 103.

The client applications 136 correspond to a variety of applications that are employed to access services provided by the network resources 109. The client applications 136 can include a web view component, whereby the client applications 136 interact with the network resources 109 to obtain network content by way of hypertext transfer protocol (HTTP) requests and responses. Alternatively, the client applications 136 can communicate with the network resources 109 using user datagram protocol (UDP), real-time transport protocol (RTP), and/or other protocols. The client applications 136 and the management application 133 can individually render a respective user interface 139 upon the display 130.

In various examples, each client application 136 that is managed communicates with network resources 109 through a per-application VPN tunnel to the tunnel endpoint 107. This per-application VPN model can be implemented by the operating system 137, as is the case with IOS, or at the application level using specific software development kits (SDKs). In the case of ANDROID, a user-space network address translation (NAT) can be employed to provide a per-application VPN model. In one implementation, transport layer security (TLS) is used on top of socket secure (SOCKS) to provide secure tunneling from the client device 103 to the tunnel endpoint 107.

Figure 3:
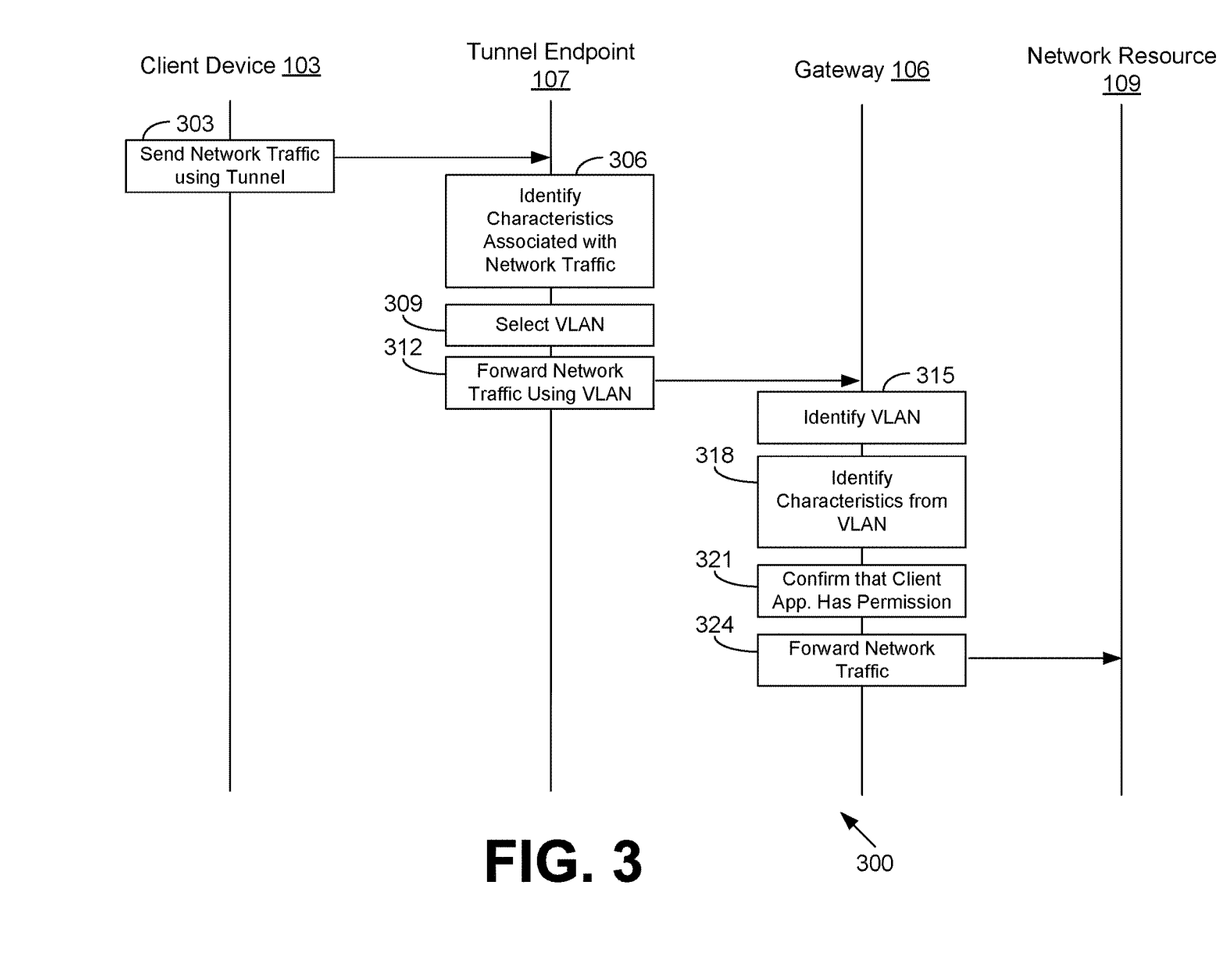
FIG. 3 is a sequence diagram illustrating an example component interaction according to various examples of the present disclosure.

Turning now to FIG. 3, shown is a sequence diagram 300 illustrating one example of interaction between a client device 103, a tunnel endpoint 107, a gateway 106, and a network resource 109. Functionality attributed to each of the client device 103, the tunnel endpoint 107, the gateway 106, and the network resource 109 can be implemented in fewer processes or application or in additional processes or applications. The separation or segmentation of functionality as discussed herein is presented for illustrative purposes only.

Beginning with step 303, a client application 136 executed by a client device 103 sends network traffic to a destination network resource 109. Because the client application 136 is a managed application, the network traffic can be routed to the tunnel endpoint 107 over the external network 121 using a per-application VPN tunnel.

At step 306, the tunnel endpoint 107 identifies one or more characteristics associated with the received network traffic. The characteristics can pertain to the client application 136 and/or the client device 103. At step 309, the tunnel endpoint 107 selects a particular VLAN 122 based at least in part on the characteristics using the characteristics to VLAN mapping process 125. At step 312, the tunnel endpoint 107 forwards the network traffic to the gateway 106 using the selected VLAN 122.

At step 315, the gateway 106 identifies the VLAN 122 through which the network traffic is received. At step 318, the gateway 106 identifies the characteristics corresponding to the VLAN 122, for example, using the VLAN to characteristics mapping process 126. At step 321, the gateway 106 confirms whether the client application 136 has permission to access the requested destination network resource 109. In so doing, the gateway 106 can compare the characteristics to the routing rules 127 to determine whether routing traffic to the particular destination network resource 109 is permitted. Assuming that the client application 136 has permission, at step 324, the gateway 106 forwards the network traffic onto the network resource 109 through the internal network 118. If permission is denied for the client application 136, the gateway 106 drops the network traffic rather than forwarding it.

Figure 4:
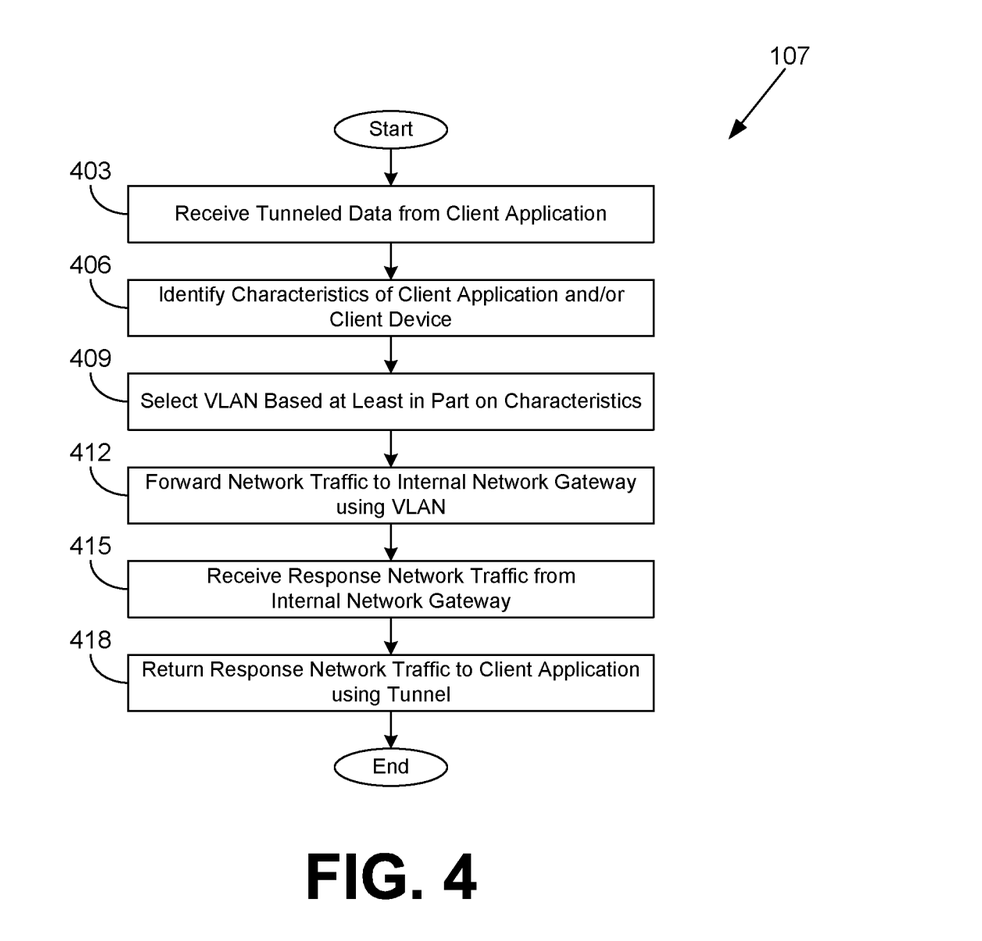
FIGS. 4 and 5 are flowcharts illustrating examples of functionality according to various examples of the present disclosure.

Moving on to FIG. 4, shown is a flowchart that provides one example of the operation of a tunnel endpoint 107. Functionality attributed to the tunnel endpoint 107 can be implemented in a single process or application or in multiple processes or applications. The separation or segmentation of functionality as discussed herein is presented for illustrative purposes only.

Beginning with step 403, the tunnel endpoint 107 receives tunneled data from a client application 136 executed by a client device 103. The tunnel endpoint 107 can decrypt the tunneled data using one or more keys or secure certificates as appropriate. At step 406, the tunnel endpoint 107 identifies one or more characteristics of the client application 136 or of the client device 103. For example, the tunnel endpoint 107 can determine a geographic location of the client device 103 (e.g., as reported by a global positioning system (GPS) device in the client device 103), the type or identity of the client application 136, a version of the client application 136, the operating system 137 of the client device 103, a user associated with the client device 103, attributes of the user, or other characteristics.

At step 409, the tunnel endpoint 107 selects a particular VLAN 122 of a plurality of possible VLANs 122 based at least in part on the characteristics. This selection can be driven by a characteristics to VLAN mapping process 125 available to the tunnel endpoint 107. As an example, if the client application 136 corresponds to a particular social networking application, a VLAN 122 with an identifier of "232" can be selected. As another example, if the client device 103 is in a certain foreign country, a VLAN 122 with an identifier of "541" can be selected. Network traffic from different client applications 136 (even on the same client device 103) can be routed through different VLANs 122.

At step 412, the tunnel endpoint 107 forwards the network traffic from the tunneled data to an internal network gateway 106 using the identified VLAN 122. At step 415, the tunnel endpoint 107 receives response network traffic from the gateway 106. This response network traffic can correspond to data generated by or otherwise served by a network resource 109, such as an internal service. At step 418, the tunnel endpoint 107 returns the response network traffic to the client application 136 using the VPN tunnel over the external network 121. Thereafter, the process can proceed to completion.

Figure 5:
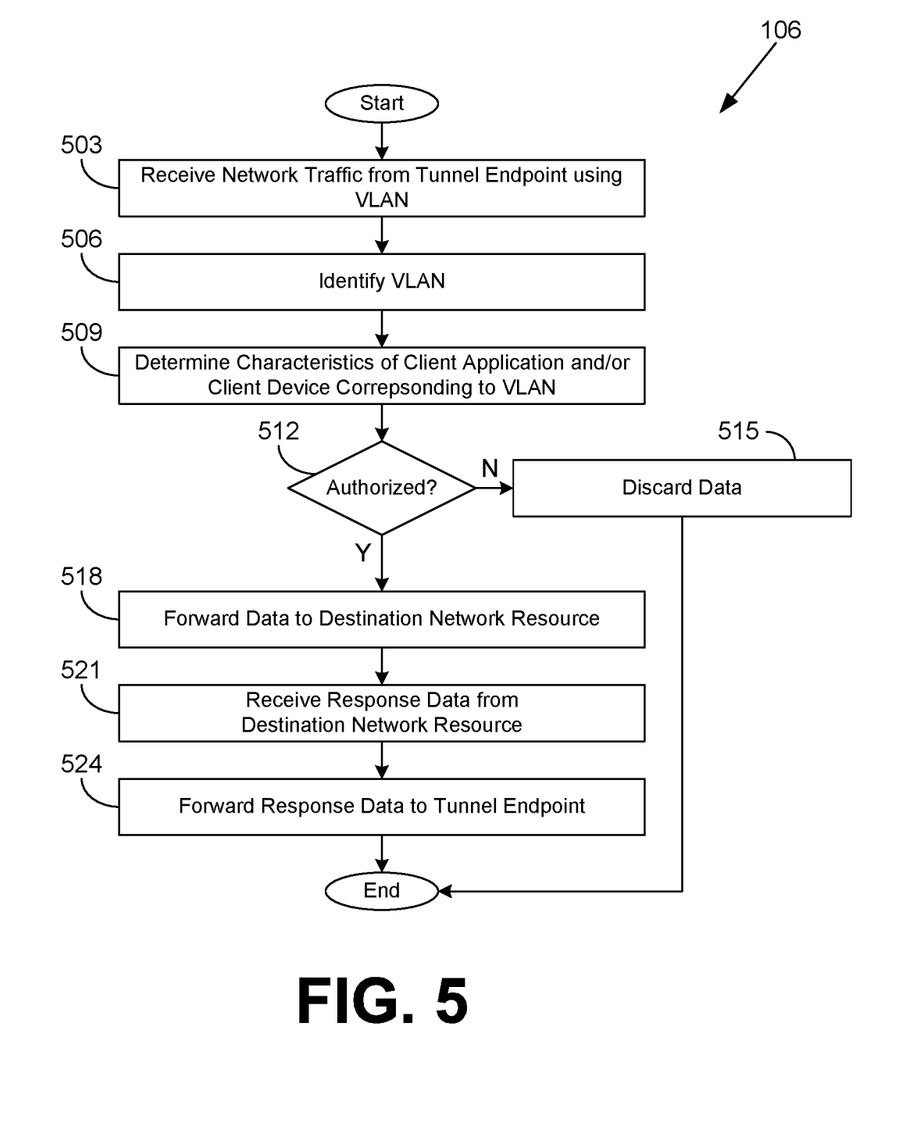

Continuing to FIG. 5, shown is a flowchart that provides one example of the operation of a gateway 106. Functionality attributed to the gateway 106 can be implemented in a single process or application or in multiple processes or applications. The separation or segmentation of functionality as discussed herein is presented for illustrative purposes only.

Beginning with step 503, the gateway 106 receives network traffic from a tunnel endpoint 107 using a VLAN 122. The gateway 106 can be configured to receive network traffic from any of the VLANs 122 used by the tunnel endpoint 107. At step 506, the gateway 106 identifies the VLAN 122 through which the network traffic is received. At step 509, the gateway 106 determines one or more characteristics of the client application 136 and/or the client device 103 that originated the network traffic. These characteristics can be determined through a VLAN to characteristics mapping process 126 available to the gateway 106.

At step 512, the gateway 106 determines whether the network traffic is authorized to be forwarded to a virtual network segment 203 and a destination network resource 109. This determination is made with reference to the characteristics determined at step 509 and the routing rules 127 available to the gateway 106. For example, network traffic from a client application 136 that is known to have security vulnerabilities can be discarded. Similarly, network traffic from a client device 103 that is physically located outside of the country can be denied forwarding to certain network resources 109. If the network traffic is not authorized, the gateway 106 discards the data at step 515. Thereafter, the process can proceed to completion. For example, if a client application 136 authorized to access accounting group resources attempts to access supplier communication group resources, the request can be denied.

Alternatively, if the network traffic is authorized, the gateway 106 forwards the data over the virtual network segment 203 to the destination network resource 109 at step 518. The gateway 106 can check the characteristics for each packet of data, or the determination of authorization can be cached for a given VLAN 122 or flow identifier (e.g., a combination of source and destination IP addresses and port numbers). At step 521, the gateway 106 receives response data from the destination network resource 109. At step 524, the gateway 106 forwards the response data to the tunnel endpoint 107. Thereafter, the process can proceed to completion.

The flowcharts of FIGS. 4 and 5 and the sequence diagram of FIG. 3 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 103, the tunnel endpoint 107, the gateway 106, the network controller 115, the network resources 109, the device management service 104, or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the client device 103, the tunnel endpoint 107, the gateway 106, the network controller 115, the network resources 109, the device management service 104, and/or other components can be stored in one or more storage devices and be executable by one or more processors. Also, a data store can be stored in the one or more storage devices.

The client device 103, the tunnel endpoint 107, the gateway 106, the network controller 115, the network resources 109, the device management service 104, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A system, comprising:
   at least one computing device; and
   a tunnel endpoint executable by the at least one computing device, the tunnel endpoint configured to cause the at least one computing device to at least:
   receive, through an application-specific virtual private network tunnel, network traffic sent by a client application executed by a mobile device;
   identify at least one characteristic of the client application from a set of one or more mobile device management attributes provided to the tunnel endpoint by a device management service;
   select a particular virtual local area network of a plurality of virtual local area networks based at least in part on the at least one characteristic;
   forward the network traffic to an internal network gateway of an organization using the particular virtual local area network;
   receive response network traffic from the internal network gateway using the particular virtual local area network; and
   return the response network traffic to the client application through the application-specific virtual private network tunnel.

2. The system of claim 1, wherein the particular virtual local area network is selected further based at least in part on a geographic location of the mobile device.

3. The system of claim 1, wherein the at least one characteristic includes a version of the client application, and the particular virtual local area network is selected based at least in part on the version of the client application.

4. The system of claim 1, wherein the client application is managed by the organization.

5. The system of claim 1, wherein when executed the tunnel endpoint is further configured to cause the at least one computing device to at least:
   receive, through another application-specific virtual private network tunnel, other network traffic sent by a different client application executed by the mobile device; and
   forward the other network traffic to the internal network gateway using a different virtual local area network of the plurality of virtual local area networks.

6. The system of claim 1, wherein the internal network gateway is configured to receive data through each of the plurality of virtual local area networks.

7. The system of claim 1, wherein when executed the tunnel endpoint further causes the at least one computing device to add a unique identifier corresponding to the particular virtual local area network to headers of a stream of Ethernet frames corresponding to the network traffic.

8. The system of claim 1, wherein when executed the tunnel endpoint further causes the at least one computing device to add a generic routing encapsulation (GRE) header corresponding to the particular virtual local area network to a stream of packets corresponding to the network traffic.

9. The system of claim 1, wherein the internal network gateway is configured to at least:
   receive the network traffic from the tunnel endpoint;
   identify the particular virtual local area network through which the network traffic is received;
   determine the at least one characteristic corresponding to the particular local area network; and
   determine whether to route the network traffic to a destination based at least in part on the at least one characteristic.

10. A method, comprising:
- receiving, through an application-specific virtual private network tunnel, network traffic sent by a client application executed by a mobile device;
- identifying at least one characteristic of the client application from a set of one or more mobile device management attributes obtained from a device management service;
- selecting a particular virtual local area network of a plurality of virtual local area networks based at least in part on the at least one characteristic;
- forwarding the network traffic to an internal network gateway of an organization using the particular virtual local area network;
- receiving response network traffic from the internal network gateway using the particular virtual local area network; and
- returning the response network traffic to the client application through the application-specific virtual private network tunnel.

11. The method of claim 10, wherein the particular virtual local area network is selected further based at least in part on a geographic location of the mobile device.

12. The method of claim 10, wherein the at least one characteristic includes a version of the client application, and the particular virtual local area network is selected based at least in part on the version of the client application.

13. The method of claim 10, further comprising:
- receiving, through another application-specific virtual private network tunnel, other network traffic sent by a different client application executed by the mobile device; and
- forwarding the other network traffic to the internal network gateway using a different virtual local area network of the plurality of virtual local area networks.

14. The method of claim 10, further comprising:
- receiving, through another application-specific virtual private network tunnel, other network traffic sent by another instance of the client application executed by a different mobile device; and
- forwarding the other network traffic to the internal network gateway using a different virtual local area network of the plurality of virtual local area networks.

15. A non-transitory computer-readable medium storing instructions that when executed by at least one computing device causes the at least one computing device to at least:
- receive, through an application-specific virtual private network tunnel, network traffic sent by a client application executed by a mobile device;
- identify at least one characteristic of the client application from a set of one or more mobile device management attributes obtained from a device management service;
- select a particular virtual local area network of a plurality of virtual local area networks based at least in part on the at least one characteristic;
- forward the network traffic to an internal network gateway of an organization using the particular virtual local area network;
- receive response network traffic from the internal network gateway using the particular virtual local area network; and
- return the response network traffic to the client application through the application-specific virtual private network tunnel.

16. The non-transitory computer-readable medium of claim 15, wherein the particular virtual local area network is selected further based at least in part on a geographic location of the mobile device.

17. The non-transitory computer-readable medium of claim 15, wherein the at least one characteristic includes a version of the client application, and the particular virtual local area network is selected based at least in part on the version of the client application.

18. The non-transitory computer-readable medium of claim 15, wherein when executed the instructions further cause the at least one computing device to at least:
- receive, through another application-specific virtual private network tunnel, other network traffic sent by a different client application executed by the mobile device; and
- forward the other network traffic to the internal network gateway using a different virtual local area network of the plurality of virtual local area networks.

19. The non-transitory computer-readable medium of claim 15, wherein when executed the instructions further cause the at least one computing device to add a unique identifier corresponding to the particular virtual local area network to headers of a stream of Ethernet frames corresponding to the network traffic.

20. The non-transitory computer-readable medium of claim 15, wherein when executed the instructions further cause the at least one computing device to at least:
- obtain a credential set from the mobile device; and
- authenticate the credential set with the device management service, wherein the set of one or more mobile device management attributes is obtained from the device management service in authenticating the credential set.

* * * * *